July 12, 1966 W. T. ENGEL 3,259,964
PIPE CLAMP
Filed June 28, 1963 3 Sheets-Sheet 1
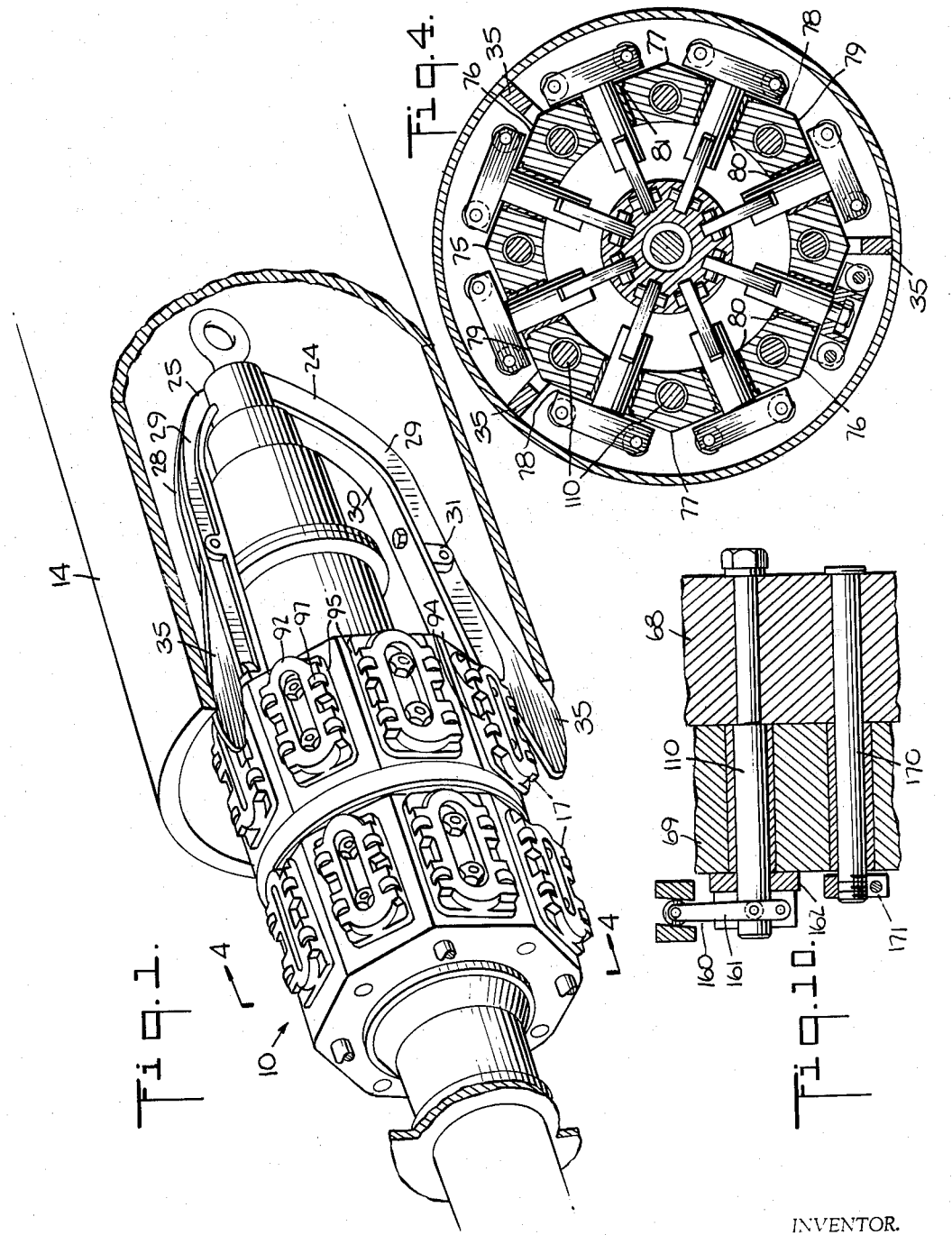
INVENTOR.
WILLIAM T. ENGEL
BY
ATTORNEY July 12, 1966  W. T. ENGEL  3,259,964
PIPE CLAMP
Filed June 28, 1963  3 Sheets-Sheet 2
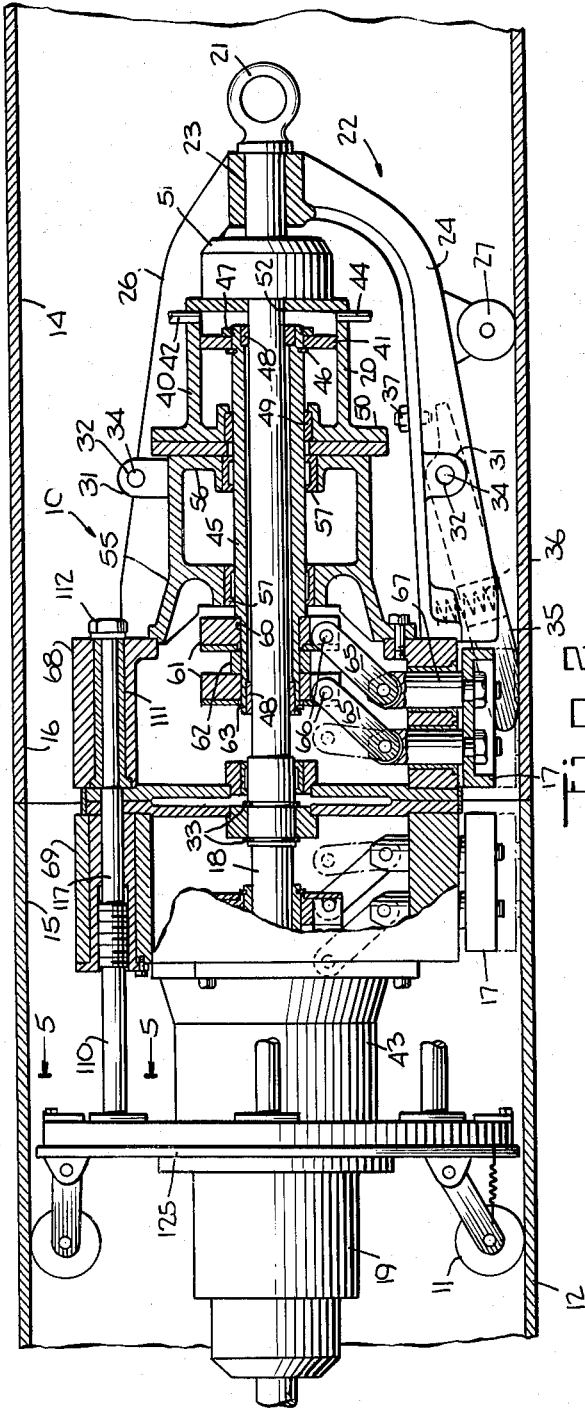
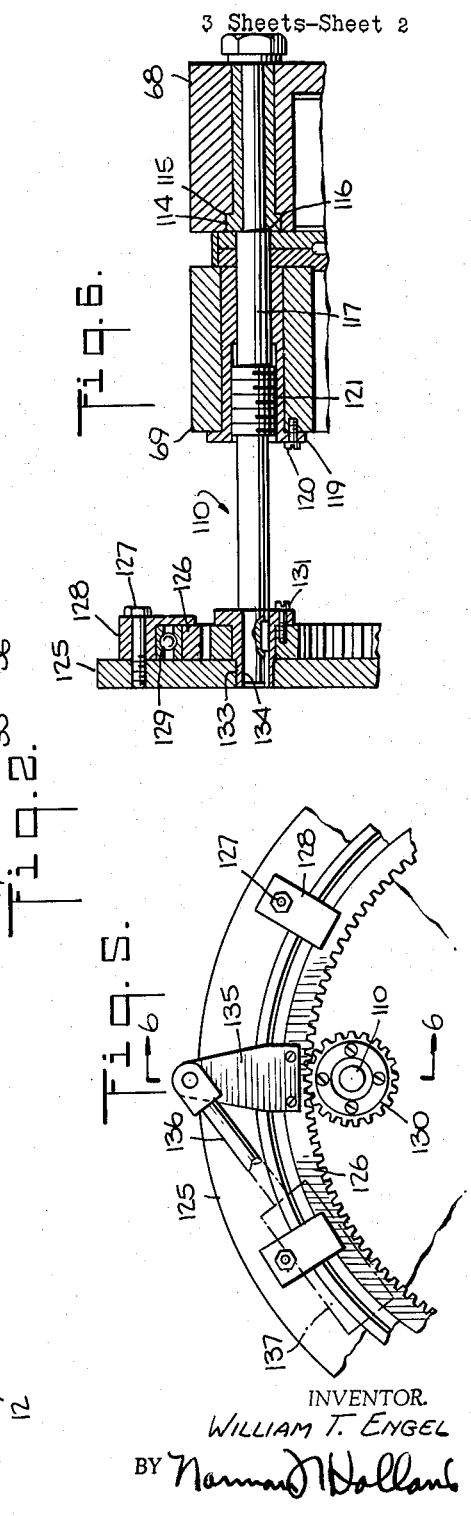
INVENTOR.
WILLIAM T. ENGEL
BY Norman Holland
ATTORNEY July 12, 1966 W. T. ENGEL 3,259,964
PIPE CLAMP
Filed June 28, 1963 3 Sheets-Sheet 3
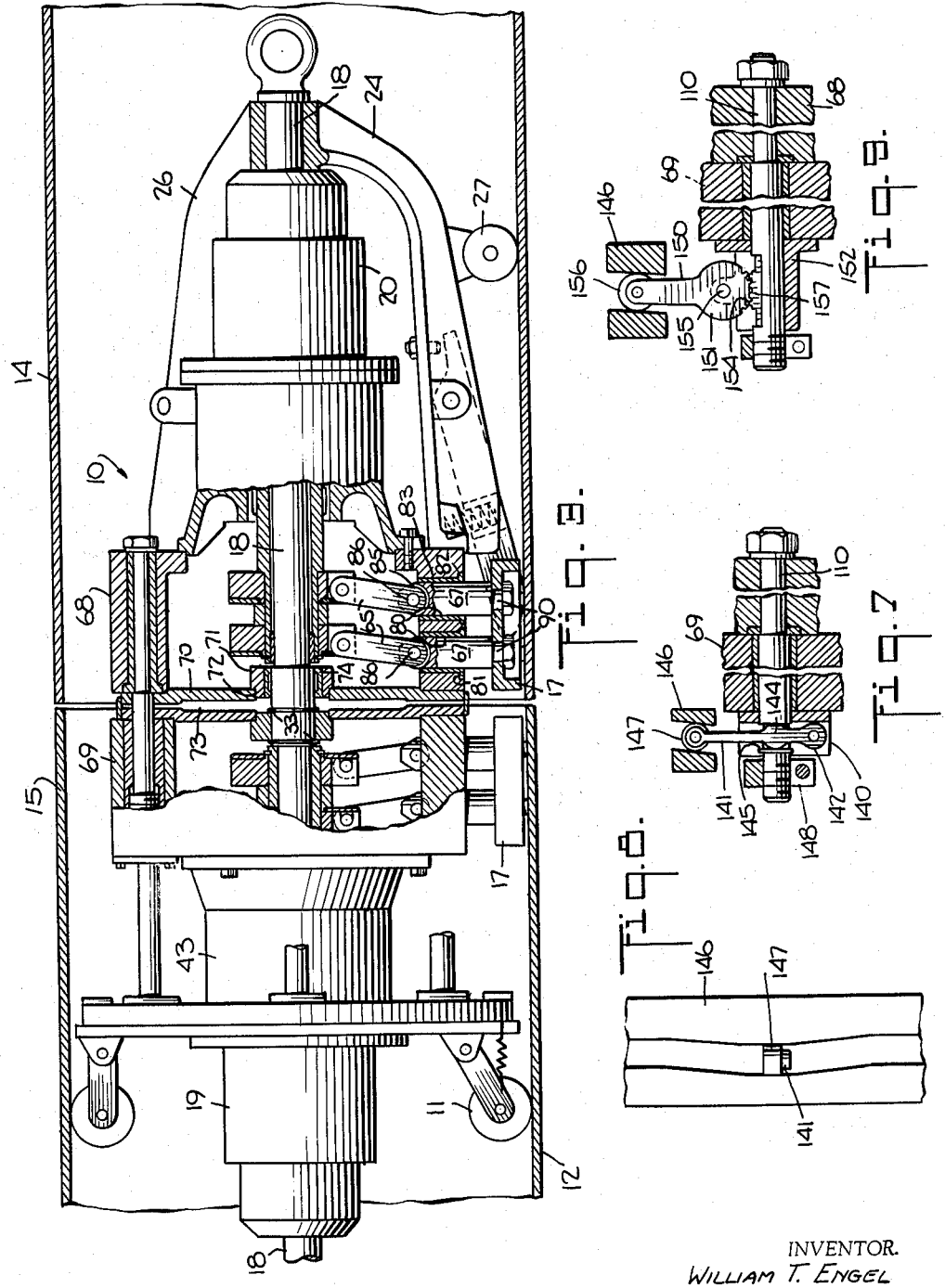
INVENTOR.
WILLIAM T. ENGEL
BY Norman Hollands
ATTORNEY

United States Patent Office 3,259,964
Patented July 12, 1966

3,259,964
PIPE CLAMP
William T. Engel, Union, N.J., assignor to Kahle Engineering Co., Union City, N.J., a corporation of New Jersey
Filed June 28, 1963, Ser. No. 291,564
6 Claims. (Cl. 29—200)

The present invention relates to a pipe clamp used for holding adjacent ends of pipes in longitudinal alignment with respect to each other during the welding together of the pipes.

In the past, it has been customary to hold pipes in abutting relation in preparation for welding. The welding process involved cutting or grinding a V notch into the seam between the two pipes. Recent developments in the art have superseded this V notch method of welding pipe sections together by welding the pipes together with flat ends held in slightly spaced relationship. Such a method is described in United States Patent No. 3,084,246 of April 2, 1963.

This present invention departs from the prior art by providing a pipe clamp that will separate the pipes to a pre-determined distance along their longitudinal axis so that a welding operation can join the pipes without the necessity of cutting or grinding a V notch.

Accordingly, it is an object of the present invention to provide an improved internal pipe clamp which will provide controlled separation between adjacent pipe ends.

It is also an object of the present invention to provide a mechanism which clamps and separates pipe ends for welding thereby minimizing the work of preparing the pipe ends for welding.

Another object of the present invention is to provide a pipe clamp having a greater dimension along the longitudinal axis of the pipes so as to improve stability of the clamped pipes.

Another object of the present invention is to provide an improved centering mandrel for locating a pipe clamp within the pipes.

Another object of the present invention is to provide a driving mechanism in association with a pipe clamp to provide a predetermined longitude displacement between adjacent pipes.

Other and further objects and improvements of the present invention will be apparent from the preferred embodiment which is set forth hereinafter.

FIG. 1 is a perspective view partially in section illustrating the positioning of the clamp with respect to a pipe end;

FIG. 2 is a side elevational view, partially in section, showing the pipe clamp as it clamps abutting pipe ends together;

FIG. 3 is a side elevational view, partly in section, of the pipe clamp showing the pipe ends in longitudinal alignment with a longitudinal displacement therebetween;

FIG. 4 is a sectional view along line 4—4 of FIG. 1;

FIG. 5 is a fragmentary side elevational view of the drive means for providing the longitudinal separation between the pipes;

FIG. 6 is a fragmentary sectional taken along line 6—6 of FIG. 5;

FIG. 7 is a fragmentary side elevational view in section of a modified drive mechanism for providing longitudinal separation between the pipes;

FIG. 8 is a fragmentary top plan view of a cam ring used with the drives illustrated in FIGS. 7, 9 and 10;

FIG. 9 is a fragmentary side elevational view in section of another drive means used to provide longitudinal separation between the pipe ends; and FIG. 10 is a further embodiment of a drive means used to provide longitudinal separation between pipe ends.

The pipe clamp 10 of the present invention is propelled either manually or by a motorized traction wheel 11 through the fixed or previously welded pipe 12 as illustrated in FIG. 2 to the junction between pipe 12 and the pipe 14 to be placed adjacent to the fixed pipe 12. The internal surfaces 15, 16 of the pipes 12 and 14 at this point are engaged or clamped by a plurality of radially extending clamp members 17 which are extended from the central shaft 18 by suitable pneumatic or hydraulic means 19 and 20. A longitudinal separation between the pipes 12 and 14 is now provided by a drive means as illustrated in FIGS. 5–10 to prepare the pipes 12 and 14 for being welded together.

A preferred embodiment of the present invention will now be described.

A longitudinal shaft 18 is used as a support member for the various components of the pipe clamp as illustrated in FIG. 2. The shaft 18 has at its forward end an eye-ring 21 to which may be connected a suitable device for manipulating the pipe clamp within the pipes. As illustrated in FIG. 1, a support frame 22 is journaled onto a forward portion of the longitudinal shaft at 23. The support frame 22 has three legs 24, 25 and 26 spaced approximately 120° apart from each other. The lowermost leg 24 of the support frame has a guide wheel 27 positioned intermediate its ends as seen in FIGS. 2 and 3. Each of the legs 24, 25 and 26 of the support frame has a pair of generally parallel flanges 28 and 29 (FIG. 1) extending outwardly from their arcuate base-plates 30.

Positioned on the outside of each of the parallel flanges 29 and 30 are bosses 31 having aligned bores 32 which receive a pivot pin 34. Fins 35 are pivotally mounted on pins 34 between parallel flanges 28 and 29. Springs 36, located between each fin and a corresponding leg of the support frame, resiliently urge each fin 35 outwardly from the support frame. Movement of each fin 35 about its pivot point is limited by a nut and bolt 37, threaded into each support frame leg.

Taken together the three spring loaded fins 35 function as a centering mandrel for positioning the pipe clamp 10 within the pipe during its movement to its clamping position. In case the pipe is out of round the spring action enables the mandrel structure to locate the pipe clamp in as near a central position as is possible.

A first fluid motor 20 is positioned within the support frame 22 and is supported by the longitudinal shaft 18. The fluid motor 20 for extending the clamp heads 17 radially of the first housing comprises a cylinder 40 having suitable inlet 42 and exhaust 44 as connections for the fluid working medium. It is to be understood that the cylinder may be of the double acting variety having additional fluid connections for operating on the opposite side of the piston. The piston 41 is mounted at the forward end of a hollow piston rod 45. Suitable means such as retainer rings 46 and a nut 47 are used to maintain the piston 41 upon the piston rod 45. The piston rod 45 is supported at both its ends by suitable bearings 48 which are slidably fitted on the longitudinal support shaft 18. The piston rod 45 is hollow and is mounted concentrically with the longitudinal support shaft 18 on bearings 48. A packing gland 49 is fitted around the piston rod 45 as it passes through the rear wall 50 of the cylinder. A stuffing box 51 is mounted at the forward end of the cylinder 41 to seal the cylinder head bore 52 through which the longitudinal support shaft 18 passes. A bearing housing 55 having its forward wall 56 abutting the rear wall 50 of the cylinder is positioned rearwardly along the longitudinal support shaft 8. The bearing housing 55 has suitable bearings 57 located at its forward and rear end walls which slidably receive the piston rod 45. The rear surface of the piston rod has an annular recess at 60. A pair of cylindrical cross heads 61 are mounted at the recessed surface 60 of the piston rod 45. The cross heads 61 are spaced by a collar 62. The cross head assembly is retained on the piston rod by a retainer ring 63.

A second fluid motor 19 is mounted after bearing box 43 on the shaft 18. The fluid motor 19 is similar to motor 20 described above and need not be repeated. The second fluid motor 19 as well as the bearing box 43 are fixedly mounted on shaft 18 while the fluid motor 20 and its associated stuffing box 51 and bearing housing 55 are slidably mounted on the shaft 18 to permit the clamp separating action to be described below.

The motors 19 and 20 are coupled to suitable sources of hydraulic fluid and are arranged to be individually and separately controlled to permit independent operation of their associated pipe clamping elements.

As best seen in FIGS. 2 and 4, eight pairs of longitudinally spaced links 65 are each pivoted at one end upon suitable pins 66 positioned near the outer periphery of each cylindrical crosshead 61. Each link 65 is pivoted at its other end to a corresponding clamp support rod 67 which will be more fully described below.

When fluid pressure is supplied within the cylinder 41, the piston rod 45 slides rearwardly on the longitudinal shaft 8. The links 65 move support rods 67 outward from the center of the clamp.

The preferred clamping arrangement of the present invention comprises eight clamps spaced about the outer surfaces of first and second housings 68 and 69 respectively. The first housing 68 is mounted at one end upon the support frame 22. A transverse plate 70 (FIG. 3) encloses the rear end of the first housing. A suitable bearing hub 71 is fitted into a bore located centrally of the transverse plate 70. A bearing 74 lines the inner surface of the bearing hub 71 and slidably supports the first housing upon the longitudinal shaft 18. It is now readily seen that the entire forward portion of the clamp, i.e., the first housing 68, the support frame 22 and the enclosed first fluid motor 20 are mounted for limited sliding movement upon the longitudinal shaft 18.

Referring to FIGS. 3 and 4, the first housing 68, being an octagonal parallelepiped in its preferred embodiment, has a casing 75 with opposite parallel surfaces 76, 77, etc. Each surface of the casing has two longitudinally spaced radial bores 80 drilled therethrough. Each bore is countersunk 81 at the surface of the housing to receive the annular shoulder 82 of sleeve bearing 83. A clamp support rod 67 is slidably fitted into each sleeve bearing 83. The clamp support rods are slotted 85 at their inner ends. Links 65, described above, are inserted into slots 85 and retained therein for pivotal movement about pins 86. Pins 86 are received in aligned bores 87 which are located on opposite sides of slots 85 on support rods 67.

The clamp support rods have a reduced diameter 90 at their ends which project from the first housing 68 whereby the clamping heads 17 are supported. The clamping heads comprise a generally rectangular baseplate 91 (FIG. 1) having an oval shaped ridge 92 on its outer surface. Suitable bifurcations 94 are located between the longitudinal edges 95 of the plate and the oval ridge. The bifurcations house and rotatably support four rollers 96, upon pivot pins. As shown in FIG. 4, each roller surfaces 97 extends above the contiguous surfaces of the oval ridge and the bifurcations. When the clamp heads are extended, only the outer surfaces of the rollers engage the inner surface of the pipe segment as is illustrated in FIG. 2.

It is to be understood that the clamp head may be of unitary construction as through casting, or suitable machining. The clamp head has its greater dimension in the longitudinal direction of the clamp in order to provide greater stability to the clamped pipes.

A second housing 69 is positioned on the longitudinal shaft rearwardly of the first housing. The construction of the second housing is similar to that of the first housing described above and need not be described in detail here.

The transverse walls of both housings have recesses 73 in their outer surfaces and are in abutting relation as illustrated as in FIG. 2. The cross heads and links of the second housing move forward to the position shown in FIG. 3 when the second fluid motor 19 is actuated. Unlike the first housing described above, the second housing is fixed, by means of retainer rings 33, against longitudinal movement along the support shaft 18. The second housing is fixed against movement, because the "camming forward" mechanism, now to be described, slides only the first housing along support shaft 18 in order to provide separation of the clamped pipes.

Referring now to FIGS. 2 and 4 it is seen that mechanism for providing longitudinal separation or the "camming forward" action of the present invention is illustrated. Drive shafts 110 extending in the direction generally parallel to the longitudinal support shaft are circumferentially spaced and extend through the first and second housings 68 and 69. In the preferred embodiment, eight drive shafts 110 are alternately spaced with respect to the clamp support rods 67 as seen in FIG. 4. The description below of one drive shaft 110 is applicable to all eight shafts.

Referring now to FIG. 2 the drive shafts 110 are providing longitudinal displacement between clamp housings 68 and 69 are journaled into the first housing and supported therein by means of a sleeve bearings 111. A suitable nut 112 is threaded onto one end of the shaft 110 to fix its position with respect to the first housing 68. A suitable collar 114 is fitted onto each shaft and is located in a recess 115 within the first housing. The collar 114 abuts the first housing recess at one of its surfaces and also abuts a shoulder 116 on the shaft 110 at its other surface (FIG. 6).

The raised diameter section 117 of the shaft extends through a suitable bearing 118 through the second housing 69 rearwardly to a drive mechanism which provides the "camming forward" movement. The sleeve bearing 118 in the second housing has an annular shoulder 119 at its rear-end suitably bolted at 120 to the second housing. The bearing 118 is threaded at 121 at its inner surface to receive the threaded portion of shaft 110.

Referring now to FIGS. 5 and 6 the drive mechanism for providing the "camming forward" movement will be described.

In connection with this embodiment of the camming forward drive, it is noted that the camming forward drive shaft 110 is threadedly engaged with the bearing sleeve 118 located in the second housing. The purpose of this threaded connection will become obvious as the drive means is described below. Annular flange 125 is positioned on and extends radially outwardly from the second bearing housing 43. An internal gear 126 is rotatably retained on the forward face of the annular flange by a suitable bolt 127, retainer plate 128, and bearing 129. Spur gears 130 are bolted at 131 to bushings 132. Bushings 132 are rotatably fitted into bores 133 of flange 125. Drive shaft 110 is fitted in bore 134 of bushing 132. Drive shaft 110 and bore 134 are splined to accommodate limited axial movement of shaft 110.

A lever plate 135 is screwed onto the internal gear 126 at one end and pivotally connected to a fluid motor piston rod 136 at its other end. The fluid motor 137 is located on annular flange 125. The piston rod 136 moves between predetermined positions to give an incremental movement to internal gear 126. Gears 132 are engaged by the internal threading by the gear 126.

When the fluid motor 137 is actuated and the internal gear 126 moves a predetermined distance, a rotation is imparted to the drive shaft 110. The shaft 110 by reason of its threaded connection advances a predetermined distance through the second housing 69 which is fixed to support shaft by means of the rings 33 illustrated in FIG. 2 and described above. Since the first housing is slideably mounted on the support shaft 18, the drive shaft 110 as it is displaced a predetermined distance will push the first housing 68 forward with respect to the second housing 69. Longitudinal thrust is transmitted through shaft 110 and collar 114 (FIG. 6) to the first housing. In this manner, a separation is provided between the adjoining pipe sections. The entire fluid motor housing 20 described above is also slideably fitted onto the shaft, and during the above described camming forward movement it also advances a predetermined distance along the support shaft. The clamping action is not disturbed since the fluid motor for the first housing and the forward section of the pipe move as a unit in the camming forward operation.

Several other embodiments described hereinbelow may be used to drive the camming forward shaft.

Referring now to FIG. 7 a bifurcated support plate 140 is attached to the second housing 69. A pivotally mounted cam follower 141 has one end 142 pivoted to the bifurcated plate. Its central section 144 is located in an annular groove 145 on the drive shaft 110. A cam ring 146 engages a roller 147 on the cam follower. The cam ring 146 is also illustrated in FIG. 8. The cam ring 146 is mounted on flange 125 in a manner described in connection with annular gear 126 above. The fluid motor 137 described in connection with the embodiment of FIG. 5 is used to advance the cam ring a predetermined distance. The movement of the cam ring 146 advances the cam follower 141 a predetermined longitudinal distance. This movement is transmitted to the drive shaft 110 which is slideably fitted in the second housing 69 and engages the first housing 68 in a manner as described above. The predetermined longitudinal movement is transmitted to the first housing 68 and spaces it with respect to the fixed second housing 69. A gage-plate 148 is threadedly secured to one end of the camming forward shaft to limit its forward movement.

Another embodiment of a camming forward drive shaft 110 is illustrated in FIG. 9. A similar drive 137 and cam 146 as used in the embodiment of FIG. 7 is used here also. The cam follower 150 used in FIG. 9 has a generally circular lower body 151 which is pivoted to a suitable support member 152 fixed on the second housing 69. The cam follower 150 has gear teeth 154 along its lower circular perimeter. It is pivoted with respect to the support member 152 at the center 155 of its lower circular body 151. A cam roller 156 is attached at the other end of follower 150 and engages the cam ring 146 described above. The camming forward shaft 110 has a suitable rack 157 machined into its upper surface which engages the geared portion of follower 150. It is readily seen that a predetermined movement of the upper position of the cam follower 150 results in a corresponding forward movement of the camming forward shaft 110 producing a separation of the clamped pipe segments 12 and 14 in a manner similar to that described above.

A further embodiment of the camming forward drive is shown in FIG. 10. The cam follower 160 of this drive takes the form of a generally elongated lever 161 which is pivoted with respect to a bifurcated support plate 162 and extends through a diametric slot 164 within the camming forward shaft 110. The slot 164 is of suitable dimensions in order to accommodate the various movements of the cam follower lever.

In this embodiment a separate shaft 170 is placed through the first and second houses 68 and 69 as illustrated in FIG. 10 in order to provide a limit gage at one end thereof for restricting the movement between the pipe segment to predetermined limits.

In operation, the clamp is positioned in one pipe which usually is the endmost section 15 of the previously welded portions of a pipeline. The clamp members 17 of the second housing 69 are positioned near the end of the pipe and are then moved into clamping engagement with the pipe walls by hydraulic motor 19. A second pipe 14 to be joined to the first pipe 12 is then placed over the forward section of the clamp 100. The clamp 10 centers the second pipe means of the centering mandrel. The two pipes are now generally in abutting relation at their end sections.

Fluid pressure is admitted to the cylinder of the fluid motor 20 causing the piston rod 45 and cross heads 61 to move in such directions, as described above, to radially project the clamp members 17 from their respective housings and against the inner walls of the second pipe 14. After the pipes are held in rigid longitudinal alignment by the clamp members 17 with end sections abutting, the "camming forward" drive motor 137 is then actuated. A predetermined forward movement is imparted to the camming forward drive shaft 110 through one of the drive means described above. As a result of the camming forward operation, the forward section of the clamp, i.e., the first housing 68 and the clamp members 17 thereon, the first fluid motor 20, the support frame 22 and the centering mandrels are 35, as a unit, advanced a predetermined distance along the longitudinal support shaft.

As is evident from the above described operation, each fluid motor 19 and 20 for extending the clamping heads 17 is individually controlled and actuated.

Hydraulic pressure is maintained in both fluid motors 19 and 20 during the camming forward operation and, as a result, the pipe segments 15 and 16 remain firmly clamped in longitudinal alignment during the camming forward movement.

In addition to the above operation, the pipe clamp of the present invention may also be used for a "camming back" operation. In this context, the "camming forward" drive shafts 110 would be actuated after clamp members 17 of the second housing 69 are moved into clamping engagement with the previously welded sections of a pipeline 12. After the second pipe 14 to be welded is clamped with respect to first housing 68, the "camming" drive mechanism may be reversed to bring the separated pipe segments closer together or into an abutting relation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An internal pipe clamp for engaging and aligning pipe sections with a pre-determined spacing between adjacent ends of the aligned pipe sections comprising the combination of an elongated center shaft having a front portion for entering one pipe section and a rear portion for protruding from said one section for entering a subsequent pipe section, a support frame attached to the forward end of said center shaft having a plurality of radially spaced guide legs extending outwardly and rearwardly of said center shaft for supporting and positioning the pipe clamp within the pipe, a pair of housings surroundings the center shaft, a pair of hydraulic motors mounted on said center shaft each attached to one of said housings, a plurality of pipe clamping members movably mounted on each of said housings for movement transversely of said center shaft for engaging said pipe sections, a pair of elongated hollow pistons one coupled to each of said hydraulic motors and being slidably and concentrically mounted on said shaft, toggle links operatively connecting said pistons and said pipe clamping members, one of said housings being slidably mounted on said shaft, a plurality of drive shafts arranged parallel to said center shaft for adjustably coupling said housings together, a fixed coupling between each of said drive shafts and one of said housings, an adjustable coupling between each of said drive shafts and the other of said housings for providing relative movement of said housings longitudinally of the drive shaft and apart from one another and, means for simultaneously operating all of said adjustable couplings for spacing said pipe sections while said sections are engaged by said pipe clamping members.

2. The pipe clamp as claimed in claim 1 in which said adjustable coupling comprises a threaded coupling and said operating means for said adjustable coupling comprises a pinion on each of said drive shafts, a gear engaging said pinions, and a drive motor operatively coupled to said gear.

3. The pipe clamp as claimed in claim 1 in which said adjustable coupling comprises a generally circular cam concentric with said center shaft, a cam follower operatively coupling each of said drive shafts to said cam, and a drive motor operatively coupled to said cam.

4. The pipe clamp as claimed in claim 1 which further comprises separate control means for each of said hydraulic motors for permitting independent operation thereof.

5. The pipe clamp as claimed in claim 1 which further comprises a support member movably connected to each of said guide legs for sliding engagement with the inner walls of said one pipe section, and a resilient member urging said support members outwardly against said one pipe section.

6. The pipe clamp as claimed in claim 1 which further comprises a plurality of rollers on each of said pipe clamping members mounted on axis parallel to said center shaft.

References Cited by the Examiner

UNITED STATES PATENTS

| | | | |
|---|---|---|---|
| 549,711 | 11/1895 | Farrensteiner | 228—4 |
| 680,228 | 8/1901 | Couston | 29—200 |
| 1,502,097 | 7/1924 | Grace | 83—524 X |
| 1,910,138 | 5/1933 | Hoodydonk | 29—431 |
| 2,061,287 | 11/1936 | Muehl | 228—4 |
| 2,458,587 | 1/1949 | Gogan | 72—402 |
| 2,525,680 | 10/1950 | Ingemarson | 269—52 X |
| 3,181,762 | 5/1965 | Persson | 228—49 |

JOHN F. CAMPBELL, *Primary Examiner.*

THOMAS H. EAGER, *Examiner.*